(12) United States Patent
Murayama et al.

(10) Patent No.: US 6,512,057 B2
(45) Date of Patent: Jan. 28, 2003

(54) RESIN COMPOSITION

(75) Inventors: Toshikazu Murayama, Yokkaichi (JP); Shigeru Murata, Suzuka (JP); Shohei Konishi, Yokkaichi (JP); Junichi Yamada, Chiba (JP); Makoto Goto, Ichikawa (JP)

(73) Assignee: Kyowa Yuka Co., Ltd., Tokyo (JP)

( * ) Notice: Subject to any disclaimer, the term of this patent is extended or adjusted under 35 U.S.C. 154(b) by 0 days.

(21) Appl. No.: 09/961,428

(22) Filed: Sep. 25, 2001

(65) Prior Publication Data

US 2002/0061942 A1 May 23, 2002

(30) Foreign Application Priority Data

Sep. 27, 2000 (JP) .......................................... 2000-293426

(51) Int. Cl.[7] ................................................. C08F 24/00
(52) U.S. Cl. .................... 525/327.3; 525/386; 528/112; 528/113; 528/115; 528/418; 528/421
(58) Field of Search .............................. 525/327.3, 386; 528/112, 113, 115, 418, 421

(56) References Cited

U.S. PATENT DOCUMENTS 3,752,870 A   8/1973   Labana et al.
6,130,297 A * 10/2000   Ramesh ................... 525/327.3

FOREIGN PATENT DOCUMENTS

EP   1 055 694   11/2000
WO   98/15587    4/1998

* cited by examiner

Primary Examiner—Robert Dawson
Assistant Examiner—D. Aylward
(74) Attorney, Agent, or Firm—Fitzpatrick, Cella, Harper & Scinto

(57) ABSTRACT

The object of the present invention is to provide resin compositions conferring cured materials (a coating or the like) with excellent appearance, excellent mechanical properties, or the like. The present invention provides resin compositions containing a vinyl copolymer with an epoxy group and a branched glutaric acid.

11 Claims, No Drawings

RESIN COMPOSITION

FIELD OF THE INVENTION

The present invention relates to a resin composition useful for use in for example a powder paint or the like, and a cured material obtained by curing the resin composition.

DESCRIPTION OF THE BACKGROUND ART

A powder paint has been known as the paint containing no organic solvent. In recent years, the non-pollution property thereof has drawn attention from the respect of so-called environmental concerns such as air pollution. Hence, the amount of the powder paint to be used has increased year after year. Depending on the use, various polymer compounds have been used as the binder resin for use in a powder paint. Specifically, a powder paint comprising an acrylic copolymer with an epoxy group in blend with an aliphatic dicarboxylic acid is useful, particularly as a top coating, owing to the excellent transparency, hardness degree and weatherability of the coating obtained from the powder paint. However, for use as a top coating, high performance is required in terms of smoothness and various mechanical properties. The powder paint known so far, comprising an acrylic copolymer with an epoxy group in blend with dodecanedioic acid or sebacic acid, is not satisfactory in a practical sense, in view of those properties described above.

SUMMARY OF THE PRESENT INVENTION

The present invention provides resin compositions containing a vinyl copolymer with an epoxy group and a branched glutaric acid.

Additionally, the present invention provides powder paints containing the resin composition, and cured materials obtained by curing the resin composition.

DETAILED DESCRIPTION OF THE PRESENT INVENTION

The vinyl copolymer with an epoxy group (sometimes simply referred to as "copolymer" hereinafter) can be produced, for example, by a method comprising copolymerizing a vinyl monomer with an epoxy group (sometimes referred to as "vinyl monomer A" hereinafter) with one or more other vinyl monomers copolymerizable (sometimes referred to as "vinyl monomer B" hereinafter), or a method comprising modifying a vinyl copolymer without an epoxy group to introduce an epoxy group therein. The latter method specifically includes for example a method comprising first synthetically preparing a vinyl copolymer with an isocyanate group within the molecule and subsequently allowing glycidol to react with the resulting copolymer, and a method comprising copolymerization of a vinyl monomer with a glycerylcarbonate group within the molecule and subsequent decarboxylation of the resulting copolymer. Additionally, a copolymer, which is obtained by copolymerization between the vinyl monomer A and the vinyl monomer B, may be modified, if necessary. Among the methods described above, the method comprising copolymerization between the vinyl monomer A and the vinyl monomer B is a simple, preferable method (a copolymer which is obtained by copolymerization between the vinyl monomer A and the vinyl monomer B, or which is a modified product of the copolymer described above is sometimes referred to as "copolymer A" hereinafter).

The vinyl monomer A includes for example glycidyl esters of (meth)acrylic acid, such as glycidyl (meth)acrylate, β-methylglycidyl (meth)acrylate, and the like; allyl glycidyl ethers such as allyl glycidyl ether, and allyl methylglycidyl ether, and the like; and alicyclic epoxy group-containing vinyl monomers such as 3,4-epoxycyclohexyl acrylate, 3,4-epoxycyclohexyl methacrylate, and the like. Herein, the term (meth)acrylic acid means methacrylic acid or acrylic acid. The other (meth)acrylic acid derivatives have similar meanings.

The vinyl monomer B includes vinyl monomers copolymerizable with the vinyl monomer A described above, with no specific limitation, for example (meth)acrylic acid esters such as methyl (meth)acrylate, ethyl (meth)acrylate, butyl (meth)acrylate, cyclohexyl (meth)acrylate, benzyl (meth)acrylate, and the like; hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, polypropylene glycol mono (meth)acrylate, and the like, or (meth)acrylates produced by adding ε-caprolactone to the various hydroxyl group-containing (meth)acrylates described above; carboxyl group-containing vinyl monomers such as (meth)acrylic acid, crotonic acid, itaconic acid, maleic acid, fumaric acid, and the like, or mono- or diesters of the carboxyl group-containing vinyl monomers described above with a monoalkyl alcohol with one to 18 carbon atoms; amino group-containing amide type vinyl monomers such as N-dimethylaminoethyl(meth)acrylamide, N-diethylaminoethyl (meth) acrylamide, N-dimethylaminopropyl (meth)acrylamide, N-diethylaminopropyl (meth)acrylamide, and the like; dialkylaminoalkyl (meth)acrylates such as dimethylaminoethyl (meth)acrylate, diethylaminoethyl (meth)acrylate, and the like; amino group-containing vinyl monomers such as tert-butylaminoethyl (meth)acrylate, tert-butylaminopropyl (meth)acrylate, aziridinylethyl (meth)acrylate, pyrrolidinylethyl (meth)acrylate, piperizinylethyl (meth)acrylate, and the like; α-olefins such as ethylene, propylene, 1-butene, and the like; halogenated olefins such as vinyl chloride, vinylidene chloride, and the like; aromatic vinyl compounds such as styrene, α-methylstyrene, vinyltoluene, and the like; hydrolyzable silyl group-containing vinyl monomers such as γ-(meth)acryloyloxypropyltrimethoxysilane, γ-(meth)acryloyloxypropyltriethoxysilane, γ-(meth)acryloyloxypropylmethyldimethoxysilane, and the like; fluorine-containing α-olefins such as vinyl fluoride, vinylidene fluoride, trifluoroethylene, tetrafluoroethylene, chlorotrifluoroethylene, bromotrifluoroethylene, pentafluoropropylene, hexafluoropropylene, and the like; perfluoroalkyl perfluorovinyl ethers or (per) fluoroalkyl vinyl ethers, such as trifluoromethyl trifluorovinyl ether, pentafluoroethyl trifluorovinyl ether, heptafluoropropyl trifluorovinyl ether, and the like, provided that the alkyl moiety in the perfluoroalkyl perfluorovinyl ethers or (per) fluoroalkyl vinyl ethers preferably contains one to 18 carbon atoms; aliphatic carboxylic acid vinyl esters such as vinyl acetate, vinyl propionate, vinyl butyrate, vinyl isobutyrate, vinyl caproate, vinyl caprylate, vinyl caprate, vinyl laurate, branched C5–C20 aliphatic carboxylic acid vinyl esters, vinyl stearate, and the like; and vinyl esters of various carboxylic acid esters with a cyclic structure, such as vinyl cyclohexanecarboxylate, vinyl methylcyclohexanecarboxylate, vinyl benzoate, vinyl p-tert-butylbenzoate, and the like.

The amount of the vinyl monomer A to be used is preferably at 3 to 99.5% by weight, more preferably at 5 to 80% by weight, and still more preferably at 10 to 60% by weight to the total of the vinyl monomers used for the production of the copolymer A. When the amount of the vinyl monomer A to be used is at 3% by weight or more, the mechanical properties of the coating obtained from a resin composition are improved more.

For the production of the copolymer, a polymerization initiator, a chain transfer agent, or the like, may preferably be used, in the case that the vinyl monomer A and the vinyl monomer B are copolymerized.

Specific examples of the polymerization initiator include azo compounds such as 2,2'-azobisisobutyronitrile, 2,2'-azobis-2-methylbutyronitrile, 2,2'-azobis-2,4-dimethylvaleronitrile, 1,1'-azobis-1-cyclohexanecarbonitrile, dimethyl 2,2'-azobisisobutyrate, 4,4'-azobis-4-cyanovaleric acid, 2,2'-azobis(2-amidinopropene) dihydrochloride salt, 2-tert-butylazo-2-cyanopropane, 2,2'-azobis(2-methylpropionamide) dihydrate, 2,2'-azobis(2,4,4-trimethylpentane), and the like; peroxyesters such as tert-butyl peroxyneodecanoate, tert-butyl peroxypivalate, tert-butyl peroxy-2-ethylhexanoate, tert-butyl peroxyisobutyrate, tert-butyl peroxylaurate, tert-butyl peroxyisophthalate, tert-butyl peroxyacetate, tert-butyl peroxyoctanoate, tert-butyl peroxybenzoate, and the like; diacyl peroxides such as benzoyl peroxide and the like; hydroperoxides such as cumene hydroperoxide and the like; methyl ethyl ketone peroxide, potassium persulfate, 1,1-bis (tert-butylperoxy)-3,3,5-trimethylcyclohexane; dialkyl peroxides or peroxydicarbonate; and hydrogen peroxide.

Specific examples of the chain transfer agent include dodecylmercaptan, laurylmercaptan, thioglycolic acid esters, mercaptoethanol, α-methylstyrene dimer, and the like.

The copolymer A is preferably produced by solution radical polymerization. For the solution radical polymerization, solvents can be used, including benzene, toluene, xylene, hexane, cyclohexane, ethyl acetate, butyl acetate, acetone, methyl ethyl ketone, methyl isobutyl ketone, diisobutyl ketone, cyclohexanone, methanol, ethanol, propanol, 2-propanol, butanol, N-methylpyrrolidone, tetrahydrofuran, acetonitrile, methoxybutanol, methoxybutyl acetate, 3-methyl-3-methoxybutanol, ethylene glycol monobutyl ether, ethylene glycol monobutyl ether acetate, diethylene glycol monobutyl ether, diethylene glycol monobutyl ether acetate, propylene glycol monomethyl ether, dipropylene glycol monomethyl ether, propylene glycol monoethyl ether, propylene glycol monomethyl ether acetate, dipropylene glycol monomethyl ether acetate, 3-methyl-3-methoxybutyl acetate, water, dimethylformamide, dimethylacetamide, dimethyl sulfoxide, and the like. The amount of the solvent to be used is not limited specifically, but the amount of that is preferably 0.2- to 100-times (in weight) the total amount of the monomers. The polymerization is generally carried out at a temperature between 10° C. and the boiling point of the solvent.

The number-average molecular weight of the copolymer is preferably 1,000 to 20,000, and more preferably 1,500 to 10,000. When the number-average molecular weight is 1,000 or more, the mechanical properties of the coating are improved more. When the number-average molecular weight is 20,000 or less, the smoothness of the coating or the like is improved more.

The softening point of the copolymer as measured by the ring and ball softening point method is preferably 80 to 150° C. When the softening point is 80° C. or more and when the copolymer is used for use in a powder paint or the like, the blocking resistance of the obtained paint is more excellent. When the softening point is 150° C. or less, the smoothness of the coating is greater.

The branched glutaric acid as a constitutive component of the resin composition of the present invention is now described.

The term "branched glutaric acid" means glutaric acid having one or more alkyl as a side chain. In this case, the alkyl includes linear or branched alkyl with one to 8 carbon atoms, which is preferably for example methyl, ethyl, propyl, isopropyl, butyl, isobutyl, sec-butyl, tert-butyl, pentyl, isoamyl, neopentyl, 2-pentyl, 3-pentyl, hexyl, heptyl, octyl, or the like. Among them, methyl, ethyl, propyl and isopropyl are preferable.

Specific preferable examples of the branched glutaric acid include 2,4-dialkylglutaric acid, 3-alkylglutaric acid, 2,3-dialkylglutaric acid, and the like. Specifically, 2,4-diethylglutaric acid, 3-methylglutaric acid and 2-ethyl-3-propylglutaric acid are more preferable.

The branched glutaric acid can be produced by treating the corresponding diol in the presence of an alkali such as sodium hydroxide, potassium hydroxide, or the like, preferably at 200 to 320° C. in a method similar to the known methods [Oil Chemistry (Abura Kagaku), Vol. 19, No.12, page 1087 (1970); Japanese Published Unexamined Patent Application No. 72948/1994; or the like]. Additionally, many of the corresponding diols as the raw material may be commercially available but the corresponding diols may be produced in a method similar to the known methods (WO 97/19904; Japanese Published Unexamined Patent Application No. 262859/1993; or the like).

For the resin composition of the present invention, a dicarboxylic acid other than the branched glutaric acid may also be used together with the branched glutaric acid. In this case, the amount of the branched glutaric acid in the present resin composition is preferably at 5% by weight or more, and more preferably at 10% by weight or more to the total amount of the dicarboxylic acids used. When the amount of the branched glutaric acid used is at 5% by weight or more, the appearance (smoothness or the like) and flexibility of the coating obtained from the resin composition are more excellent. The other dicarboxylic acids usable in combination include dicarboxylic acids with 3 to 22 carbon atoms. Specific preferable examples thereof include succinic acid, adipic acid, pimeric acid, suberic acid, azelaic acid, sebacic acid, brassylic acid, dodecanedioic acid, eicosanedioic acid, and the like. Among them, sebacic acid and dodecanedioic acid are preferable.

The amount of the branched glutaric acid in the present resin composition is preferably at 0.5 to 2 equivalents (in molar ratio) to the epoxy group in the copolymer. In the case that the other dicarboxylic acids are used, the total amount of the dicarboxylic acids including the branched glutaric acid in the present resin composition is preferably at 0.5 to 2 equivalents (in molar ratio) to the amount of the epoxy group in the copolymer.

Depending on the use and if necessary, the resin composition of the present invention may contain various additives such as organic or inorganic pigments, fluidity adjusting agents, ultraviolet absorbing agents, antioxidants, or the like; fibril derivatives such as nitrocellulose, cellulose acetate butyrate, or the like; or resins such as chlorinated polyethylene, chlorinated polypropylene, petroleum resins, amino resins, epoxy resins, chlorinated rubber, or the like.

Various known methods are applicable as the method for producing a powder paint from the resin composition of the present invention. For example, the copolymer and the branched glutaric acid are mixed together, followed by addition and mixing of pigments, flow-out agents, or the like, if necessary; and then, the resulting mixture are melt and kneaded, and sequentially subjected to fine pulverization process and classification process, to obtain the powder paint of the present invention. Preferably, the particle diameter of the powder paint of the present invention is 100 μm or less.

The powder paint of the present invention is applied on various materials, for example by a static coating method or the like, which is then baked under heating according to general methods to obtain a coating. The heating temperature in this case is not specifically limited, but is preferably 80 to 250° C. The coating obtained from the powder paint of the present invention is excellent in terms of coating appearance (gross, etc.), curability, weatherability, mechanical properties, or the like.

The material to be coated with the powder paint of the present invention includes for example various metal materials or metal products such as aluminium, stainless steel, chromium plate, galvanized iron sheet, tin plate, and the like; and inorganic building materials such as a roof tile, glass, and the like.

The powder paint of the present invention can be used as paints for a vehicle top coating, a solid color, a clear paint for metallic coating, a clear paint in combination with an aqueous metallic base, a vehicle intermediate coating, vehicle parts, a building, various metal products, or the like.

The cured material obtained from the resin composition of the present invention can be prepared by a method similar to that for preparing a coating from the powder paint of the present invention as described above. The coating obtained from the powder paint of the present invention is also one of the embodiments of the cured material obtained from the resin composition of the present invention.

DESCRIPTION OF THE PREFERRED EMBODIMENTS

The terms "part" and "%" below mean "part by weight" and "% by weight", respectively, with no exception, unless otherwise stated.

Reference Example 1

Preparation of a vinyl copolymer with an epoxy group No.1

In a reactor with a stirrer, a thermometer, a condenser and a nitrogen gas inlet were charged 500 parts of xylene. Then, the temperature was raised to 130° C. in a nitrogen atmosphere. Into the reactor was dropwise added a mixture of 250 parts of methyl methacrylate, 100 parts of butyl methacrylate, 150 parts of glycidyl methacrylate and 30 parts of tert-butyl peroxyoctanoate over 4 hours. Even after the termination of dropwise addition, the resulting mixture was kept at the same temperature for 10 hours. After the completion of the polymerization, xylene was distilled off under reduced pressure (about 3,990 Pa) from the resin solution, to obtain a copolymer in a solid state with a non-volatile content of 99.5%, a softening point of 107° C. as measured by the ring and ball softening point method, an epoxy equivalent of 490 and a number-average molecular weight of 2,900. The copolymer is referred to as polymer A-1 hereinafter.

Reference Example 2

Preparation of a vinyl copolymer with an epoxy group No.2

In a reactor similar to that in Reference Example 1 were charged 500 parts of xylene, and then the temperature was raised to 130° C. in a nitrogen atmosphere. Into the reactor was dropwise added a mixture of 150 parts of methyl methacrylate, 125 parts of butyl methacrylate, 75 parts of styrene, 150 parts of glycidyl methacrylate and 20 parts of tert-butyl peroxyoctanoate over 4 hours. Thereafter, the procedures similar to those in Reference Example 1 were carried out, to obtain a copolymer in a solid state with a non-volatile content of 99.6%, a softening point of 105° C. as measured by the ring and ball softening point method, an epoxy equivalent of 500 and a number-average molecular weight of 3,100. The copolymer is referred to as polymer A-2 hereinafter.

Examples 1 to 6 and Comparative Examples 1 and 2

Preparation of a powder paint

Components were mixed together at blend ratios shown in Tables 1-1 and 1-2. Then, the mixtures were individually kneaded under heating, respectively, with a cokneader (single screw extruder of Model PR-46, manufactured by BASF, Co., Switzerland). After the kneaded mixtures were coarsely ground and pulverized finely, powder paints of a mean particle size of 30 to 40 microns (μm) were prepared.

TABLE 1-1

| Blended quantities in Examples and Comparative Examples | | | |
|---|---|---|---|
| | Example 1 | Example 2 | Comparative Example 1 |
| Copolymer | | | |
| A-1 | 83 | 83 | 80 |
| A-2 | — | — | — |
| A curing agent | | | |
| DDA [1] | 5 | 8 | 20 |
| Sebacic acid | — | — | — |
| DEGA [2] | 12 | 9 | — |
| MGA [3] | — | — | — |
| EPGA [4] | — | — | — |
| TAIPAQUE CR-93 [5] | 25 | 25 | 25 |
| Modaflow [6] | 1 | 1 | 1 |
| A powder paint | T-1 | T-2 | T-3 |

[1] Dodecanedioic acid
[2] 2,4-Diethylglutaric acid
[3] 3-Methylglutaric acid
[4] 2-Ethyl-3-propylglutaric acid
[5] Trade name of titanium oxide, manufactured by ISHIHARA SANGYO, Co., LTD.
[6] Trade name of a flow-out agent, manufactured by Monsanto, Co., Ltd., USA.

TABLE 1-2

| Blended quantities in Examples and Comparative Examples | | | | | |
|---|---|---|---|---|---|
| | Example 3 | Example 4 | Example 5 | Example 6 | Comparative Example 2 |
| Copolymer | | | | | |
| A-1 | — | — | — | — | — |
| A-2 | 80 | 80 | 80 | 80 | 80 |

TABLE 1-2-continued

Blended quantities in Examples and Comparative Examples

| | Example 3 | Example 4 | Example 5 | Example 6 | Comparative Example 2 |
|---|---|---|---|---|---|
| A curing agent | | | | | |
| DDA [1] | — | — | — | — | — |
| Sebacic acid | 5 | 10 | 10 | 10 | 20 |
| DEGA [2] | 15 | 10 | — | — | — |
| MGA [3] | — | — | 10 | — | — |
| EPGA [4] | — | — | — | 10 | — |
| TAIPAQUE CR-93 [5] | 25 | 25 | 25 | 25 | 25 |
| Modaflow [6] | 1 | 1 | 1 | 1 | 1 |
| A powder paint | T-4 | T-5 | T-6 | T-7 | T-8 |

[1] Dodecanedioic acid
[2] 2,4-Diethylglutaric acid
[3] 3-Methylglutaric acid
[4] 2-Ethyl-3-propylglutaric acid
[5] Trade name of titanium oxide, manufactured by ISHIHARA SANGYO, Co., LTD.
[6] Trade name of a flow-out agent, manufactured by Monsanto, Co., Ltd., USA.

Test Example 1

Using the powder paint obtained in Examples 1 to 6 or Comparative Examples 1 to 2, static powder coating was effected on "Bondelite #3030" (manufactured by Nihon Parkerizing Co.: a soft steel board treated with a zinc phosphate-series processing agent), followed by baking at 150° C. for 20 minutes to obtain a coating. Various properties of these coatings were assessed by the following assessment methods. The results are shown in Tables 2 and 3.

1. Smoothness

Smoothness was assessed, visually, by using samples applied on a zinc phosphate-treated steel board. The assessment was made according to the following 5-grade system.
5: totally no waving, crease or roughness on a coated surface.
4: slight waving, crease or roughness on a coated surface.
3: some waving, crease or roughness on a coated surface.
2: much waving, crease or roughness on a coated surface.
1: far more waving, crease or roughness on a coated surface.

2. Gloss

The specular gloss test defined by JIS K5400 was carried out, by using samples applied on a zinc phosphate-treated steel board. The incidence angle and reflection angle were 60°.

3. Adhesion (checkerboard grid test)

The checkerboard grid tape method defined by JIS K5400 was carried out, by using samples applied on a zinc phosphate-treated steel board. After making incisions in the shape of a checkerboard grid at a 1-mm interval into the coating, the coating was peeled off with cellophane tape. The number of squares remaining without being peeled among 100 squares was used as an assessment score.

4. Pencil hardness

The pencil scratch test defined by JIS K5400 was carried out, by using samples applied on a zinc phosphate-treated steel board, to make assessment on the basis of the break of the coating. The results are shown by the maximum pencil hardness with no occurrence of the break even by scratching.

5. Erichsen test

The Erichsen test defined by JIS K5400 was carried out, by using samples applied on a zinc phosphate-treated steel board. Assessment was made on the basis of the coating crack. The results are shown by the maximum extrusion distance with no occurrence of the coating crack.

6. Impact resistance

The Dupont-type impact resistance test was carried out, by using samples applied on a zinc phosphate-treated steel board. Assessment was made on the basis of the crack or peeling of the coating. The weight of the sinker was 500 g. The results are shown by the maximum height (distance) of the dropping sinker with no occurrence of the crack or peeling of the coating, even at impact.

TABLE 2

Assessment results of Examples and Comparative Examples

| | Example 1 | Example 2 | Comparative Example 1 |
|---|---|---|---|
| Powder coating | T-1 | T-2 | T-3 |
| Film thickness (μm) | 62 | 60 | 63 |
| Smoothness (visual assessment) | 5 | 5 | 4 |
| Gloss (60-degree specular reflectance in %) | 95 | 94 | 90 |
| Adhesion (checkerboard grid test) | 100/100 | 100/100 | 100/100 |
| Pencil hardness | 2H | 2H | 2H |
| Erichsen (mm) | 7 or more | 7 or more | 6 |
| Impact resistance (cm/500 g) | 50 or more | 50 or more | 45 |

TABLE 3

Assessment results of Examples and Comparative Examples

| | Example 3 | Example 4 | Example 5 | Example 6 | Comparative Example 2 |
|---|---|---|---|---|---|
| Powder coating | T-4 | T-5 | T-6 | T-7 | T-8 |
| Film thickness (μm) | 61 | 63 | 63 | 62 | 60 |
| Smoothness (visual assessment) | 5 | 5 | 5 | 5 | 4 |
| Gloss (60-degree specular reflectance in %) | 93 | 93 | 93 | 93 | 88 |

TABLE 3-continued

Assessment results of Examples and Comparative Examples

|  | Example 3 | Example 4 | Example 5 | Example 6 | Comparative Example 2 |
|---|---|---|---|---|---|
| Adhesion (checkerboard grid test) | 100/100 | 100/100 | 100/100 | 100/100 | 100/100 |
| Pencil hardness | 2H | 2H | 2H | 2H | 2H |
| Erichsen (mm) | 7 or more | 7 or more | 7 or more | 7 or more | 6 |
| Impact resistance (cm/500 g) | 50 or more | 50 or more | 50 or more | 50 or more | 35 |

Tables 2 and 3 indicate that the powder paint of the present invention can confer coatings with excellent mechanical properties such as appearance, flexibility, impact resistance, or the like.

In accordance with the present invention, resin compositions are provided, which confer cured materials (coatings or the like) with excellent appearance, excellent mechanical properties, or the like.

What is claimed is:

1. A resin composition comprises a vinyl copolymer with an epoxy group and 2,4-dialkylglutaric acid.

2. The resin composition according to claim 1, which contains a dicarboxylic acid other than the 2,4-dialkylglutaric acid.

3. The resin composition according to claim 1 or 2, wherein the total amount of dicarboxylic acid including 2,4-dialkylglutaric acid is 0.5 to 2 times (in molar ratio) that of the epoxy group.

4. A powder paint containing the resin composition according to claim 1 or 2.

5. A cured material obtained by curing the resin composition according to claim 1 or 2.

6. The resin composition according to claim 1, wherein 2,4-dialkylglutaric acid is 2,4-diethylglutaric acid.

7. A powder paint containing the resin composition according to claim 6.

8. A cured material obtained by curing the resin composition according to claim 6.

9. The resin composition according to claim 3, wherein 2,4-dialkylglutaric acid is 2,4-diethylglutaric acid.

10. A powder paint containing the resin composition according to claim 9.

11. A cured material obtained by curing the resin composition according to claim 9.

* * * * *